United States Patent
Haglund et al.

(10) Patent No.: US 9,285,460 B2
(45) Date of Patent: Mar. 15, 2016

(54) METHOD AND SYSTEM FOR ESTIMATING INFORMATION RELATED TO A VEHICLE PITCH AND/OR ROLL ANGLE

(71) Applicant: SAAB Vricon Systems AB, Linkoeping (SE)

(72) Inventors: Leif Haglund, Brokind (SE); Folke Isaksson, Linkoeping (SE); Michael Felsberg, Linkoeping (SE); Bertil Grelsson, Linkoeping (SE)

(73) Assignee: SAAB Vricon Systems AB, Linkoeping (SE)

( * ) Notice: Subject to any disclaimer, the term of this patent is extended or adjusted under 35 U.S.C. 154(b) by 0 days.

(21) Appl. No.: 14/362,767

(22) PCT Filed: Apr. 14, 2014

(86) PCT No.: PCT/SE2014/050457
§ 371 (c)(1),
(2) Date: Jun. 4, 2014

(87) PCT Pub. No.: WO2015/160287
PCT Pub. Date: Oct. 22, 2015

(65) Prior Publication Data
US 2015/0323648 A1    Nov. 12, 2015

(51) Int. Cl.
*G01C 21/20* (2006.01)
*G05D 1/08* (2006.01)
(Continued)

(52) U.S. Cl.
CPC .............. *G01S 5/163* (2013.01); *G01C 11/00* (2013.01); *G01C 21/20* (2013.01); *G01S 17/06* (2013.01); *G09B 9/48* (2013.01); *B64C 2201/00* (2013.01); *G01C 15/14* (2013.01)

(58) Field of Classification Search
CPC ......... G01S 5/163; G01S 17/06; G01C 11/00; B64C 2201/00
See application file for complete search history.

(56) References Cited

U.S. PATENT DOCUMENTS 3,069,654 A     12/1962  Hough
8,259,174 B2 *  9/2012   Zhang .................. G06K 9/4647
                                                         348/148

(Continued)

FOREIGN PATENT DOCUMENTS

AU    2004202924 A1    1/2006
EP       2442275 A2    4/2012
JP    2007-255955   * 10/2007

OTHER PUBLICATIONS

Gyer, Maurice S., "Methods for Computing Photogrammetric Refraction Corrections for Vertical and Oblique Photographs", Photogrammetric Engineering & Remote SEnsing, Mar. 1996, pp. 301-310, vol. 62, No. 3, American Society for Photogrammetry and Remote Sensing, USA.

(Continued)

*Primary Examiner* — Michael J Zanelli
(74) *Attorney, Agent, or Firm* — Alston & Bird LLP

(57) ABSTRACT

The present disclosure relates to a method (200) for estimating information related to a vehicle pitch and/or roll angle. The method comprises a step of obtaining (220) a first estimate of the information related to the pitch and/or roll angle. The method is characterized by the steps of capturing (210) an image of an area covering at least a part of the horizon using a camera mounted on the airborne vehicle, and determining (240) an improved estimate of the information related to the pitch and/or roll angle based on the first estimate of the information related to the pitch and/or roll angle, and a digital elevation model.

24 Claims, 5 Drawing Sheets

(51) Int. Cl.
*G09B 9/48* (2006.01)
*G01C 15/14* (2006.01)
*G01S 5/16* (2006.01)
*G01S 17/06* (2006.01)
*G01C 11/00* (2006.01)

(56) References Cited

U.S. PATENT DOCUMENTS

2009/0125223 A1* 5/2009 Higgins ............... G06T 7/2033
701/532
2011/0301925 A1 12/2011 McWilliams, III et al.

OTHER PUBLICATIONS

Angelino, Cesario Vincenzo, et al., "High Altitude UAV Navigation Using IMU, GPS and Camera", Proceedings of the 16th International Conference on Information Fusion, Jul. 9-12, 2013, 8 pages, International Society of Information Fusion, U.S.A.

Angelino, Cesario Vincenzo, et al., "UAV Position and Attitude Estimation Using IMU, GNSS and Camera", Proceeding of the 15th International Conference on Information Fusion, 2012, 8 pages, IEEE, U.S.A.

El Rahman Shabayek, Abd, et al., "Vision Based UAV Attitude Estimation: Progress and Insights", *The Journal of Intelligent and Robotic Systems*, 2011, 14 pages, Springer Science+Business Media B.V, The Netherlands.

Grelsson, Bertil, et al., "Probabilistic Hough Voting for Attitude Estimation from Aerial Fisheye Images", *Image Analysis*, 2013, 11 pages, Springer-Verlag, Germany.

Natraj, Ashutosh, et al., "Omnidirectional Vision for UAV: Applications to Attitude, Motion and Altitude Estimation for Day and Night Conditions", *The Journal of Intelligent and Robotic Systems*, 2012, 15 pages, Springer Science+Business Media B.V, The Netherlands.

Oreifej, Omar, et al., "Horizon Constraint For Unambiguous UAV Navigation in Planar Scenes", Proceedings of the IEEE International Conference on Robotics and Automation, May 9-13, 2011, 7 pages, IEEE, U.S.A.

International Searching Authority, International Search Report and Written Opinion for International Application No. PCT/SE2014/050457, Jan. 23, 2015, 13 pages, Swedish Patent and Registration Office, Stockholm.

Dumble, Steven J., et al., "Efficient Terrain-Aided Visual Horizon Based Attitude Estimation and Localization", *The Journal of Intelligent and Robotic Systems*, 2014, 17 pages, Springer Science+Business Media B.V, The Netherlands.

* cited by examiner

METHOD AND SYSTEM FOR ESTIMATING INFORMATION RELATED TO A VEHICLE PITCH AND/OR ROLL ANGLE

CROSS REFERENCE TO RELATED APPLICATIONS

This application is a National Stage Application, filed under 35 U.S.C. §371, of International Application No. PCT/SE2014/050457, filed Apr. 14, 2014, the contents of which are hereby incorporated by reference in their entirety.

BACKGROUND

1. Related Field

The present disclosure relates to a method for estimating information related to a vehicle pitch and/or roll angle. The present disclosure particularly relates to a method for estimating information related to a vehicle pitch and/or roll angle, wherein a first estimate of the information related to the pitch and/or roll angle is obtained.

The present disclosure further relates to a system for estimating information related to a vehicle pitch and/or roll angle.

2. Description of Related Art

For navigation of unmanned aerial vehicles (UAVs) continuous absolute estimation/determination of the vehicle orientation (attitude) is crucial. Today, the most common solution to obtain this information is sensor fusion of data from GPS and inertial sensors (IMUs).

There are several image based methods proposed in the literature where horizon detection is used for vehicle attitude estimation.

Gyer M. *Methods for Computing Photogrammetric Refraction for Vertical and Oblique Photographs. Photogrammetric Engineering and Remote Sensing*, 1996 describes refraction of light in the atmosphere.

BRIEF SUMMARY

The attitude accuracy obtainable with a system comprising of a GPS and a highly accurate IMU is sufficient in most airborne navigation problems. However, GPS reception may not always be available in certain environments and in a conflict situation.

Also, highly accurate IMUs often weigh a few kilos and may exceed the payload limit for lighter airborne vehicles. The accurate IMUs are also very costly and are often subject to export restrictions.

All IMU's suffer from drift, i.e. errors accumulate over time, resulting in unreliable absolute measurements with time. Lighter and less costly IMU's have larger drift and need support from additional sensors to maintain an accurate absolute orientation estimate over time.

One objective of the present disclosure is therefore to improve attitude accuracy. This has in one embodiment been achieved by estimating information related to absolute vehicle pitch and roll angles from image horizon detection and digital elevation model data.

One embodiment of the present disclosure relates to a method for estimating information related to a vehicle pitch and/or roll angle. The method comprises a step of obtaining a first estimate of the information related to the pitch and/or roll angle. The method further comprises a step of capturing an image of an area covering at least a part of the horizon using a camera mounted on the airborne vehicle, and a step of determining an improved estimate of the information related to the pitch and/or roll angle based on the first estimate of the information related to the pitch and/or roll angle, and a digital elevation model.

This method provides improved real-time capability that uses a digital elevation model (DEM) to improve the accuracy of the estimate of pitch and/or roll angle related information.

The proposed invention can be used as a stand-alone sensor for absolute vehicle attitude or three dimensional position estimation or as part of a sensor fusion network.

The accuracy of the method will depend on the resolution of the camera and the DEM used in the implementation. That accuracy will be obtainable throughout the complete flight and will not degrade with flight time in contrast to an inertial device.

The concept of the method allows the camera used to be either an optical sensor or an IR sensor. Thereby, the system can be used at day or night.

In one option, the camera is an omni-directional camera.

In one option, the first estimate of the information related to the pitch and/or roll angle is obtained based on a first horizon estimate, wherein the earth is assumed to be spherical with no topography.

In one option, the method further comprises a step of obtaining at least one second horizon estimate based on the digital elevation model. The determination of the improved estimate of the information related to the pitch and/or roll angle estimate is then based on the obtained at least one second horizon estimate and preferably the first horizon estimate.

In one option, the step of determining the at least one second horizon estimate comprises the following steps:
- obtaining the respective elevation profile for a plurality of angular directions $\alpha_i$ around the vehicle from the digital elevation model based on a vehicle and/or camera three dimensional position,
- determining the largest incidence angle on the camera, that is generated by all land objects at heights and distances given by the extracted elevation profile, and
- determining for each angular direction $\alpha_i$ along the respective elevation profile the maximum of all incidence angles to be the geometrical effective horizon point.

In one option, a plurality of candidate second horizon estimates are determined each related to a candidate camera and/or vehicle three dimensional position. In accordance with this option, the determination of an improved estimate of the information related to the pitch and/or roll angle involves selecting that candidate second horizon estimate which provides a best fit between the first horizon estimate and the second horizon estimate.

In one option, the improved pitch and/or roll angle related estimate obtaining element is arranged to obtain the camera and/or vehicle three dimensional position related to the the selected candidate second horizon estimate as the true camera and/or vehicle three dimensional position.

In one option, the camera and/or vehicle three dimensional position related to the the selected candidate second horizon estimate is determined to be the true camera and/or vehicle three dimensional position.

In one option, the determination of the largest incidence angle on the camera, which is generated by all land objects at heights and distances given by the extracted elevation profile, is performed based on an extensive search. In an alternative example, the determination is performed based on a look-up table comprising information related to incidence angles on the camera for substantially all objects along the elevation profile. The look-up table comprises in one option input parameters related to camera and/or vehicle three dimensional position, object height and/or distance from the camera; and an output parameter related to incidence angle on the camera. In one example the position of the camera and/or vehicle is known in an XY plane and the input parameter is height of the camera and/or vehicle.

In one option, the step of obtaining the first estimate of the pitch and/or roll angle related information comprises obtaining the first horizon estimate based on the captured image. In this option, the step of determining an improved estimate of the pitch and/or roll angle related information comprises adjusting the first estimate of the pitch and/or roll angle related information based on a relation between the first horizon estimate and the second horizon estimate.

In one option, the determination of the first estimate of the pitch and/or roll angle related information comprises back projecting determined horizon edge pixels in the image onto the unit sphere, and determining the first estimate of the pitch and/or roll related information based on the back projected edge pixels.

In one option, the determination of the first estimate of the pitch and/or roll related information based on the back projected edge pixels comprises probabilistic voting such as probabilistic Hough voting for all edge pixels.

In one option, the first horizon estimate is determined based on the back projected edge pixels.

In one option, the method further comprises steps of extracting those edge pixels which are within a determined range from the first horizon estimate and projecting the extracted edge pixels onto the unit sphere so as to provide an updated first horizon estimate. In this option, the step of determining an improved estimate of the pitch and/or roll related information comprises adjusting the first estimate of the pitch and/or roll related information based on a relation between the updated first horizon estimate and the second horizon estimate.

The present disclosure also relates to a system for estimating information related to a vehicle pitch and/or roll angle. The system comprises a processing unit having a first pitch and/or roll angle related estimate obtaining element arranged to obtain a first estimate of the information related to the pitch and/or roll angle. The system further comprises at least one camera mounted on the airborne vehicle. The camera is arranged to capture an image of an area covering at least a part of the horizon. The system further comprises a database arranged to store a digital elevation model. The processing unit comprises further an improved estimate obtaining element arranged to determine an improved estimate of the information related to the pitch and/or roll angle based on the first estimate of the pitch and/or roll angle related information, and the digital elevation model.

In one option, the first pitch and/or roll angle related estimate obtaining element is arranged to obtain the first estimate of the pitch and/or roll angle related information based on a first horizon estimate, wherein the earth is assumed to be spherical with no topography. In one example, the first horizon estimate is determined based on the image.

In one option, the improved pitch and/or roll angle related estimate obtaining element is arranged to obtain at least one second horizon estimate based on the digital elevation model, and to determine the improved estimate of the pitch and/or roll angle related information based on the obtained at least one second horizon estimate.

In one option, the improved pitch and/or roll related estimate obtaining element is arranged to determine the second at least one horizon estimate by extracting the elevation profile in all angular directions $\alpha_i$ around the vehicle from the digital elevation model based on a vehicle three dimensional position, determining the largest incidence angle on the camera, that is generated by all land objects at heights and distances given by the extracted elevation profile, and determining for each angular direction $\alpha_i$ the maximum of all incidence angles along the elevation profile to be the geometrical horizon point where the elevation profile is valid.

In one example, the system comprises means for performing an extensive search so as to determine the largest incidence angle on the camera. Alternatively, the system comprises a look-up table comprising information related to incidence angles on the camera for substantially all objects along the elevation profile. The improved estimate obtaining element is then arranged to determine the largest incidence angle on the camera, which is generated by all land objects at heights and distances given by the extracted elevation profile based on the look-up table.

In one option, the first pitch and/or roll angle related estimate obtaining element is arranged to obtain a first horizon estimate based on the captured image. The improved pitch and/or roll angle related estimate obtaining element is then arranged to adjust the first estimate of the pitch and/or roll angle related information based on a relation between the first horizon estimate and the at least one second horizon estimate so as to determine the improved estimate of the pitch and/or roll angle related information.

The first pitch and/or roll angle related estimate obtaining element is in one option arranged to back project determined, detected edge pixels onto the unit sphere, and to determine the first estimate of the pitch and/or roll angle related information based on the back projected edge pixels.

The first pitch and/or roll angle related estimate obtaining element is in one option arranged to perform probabilistic voting such as probabilistic Hough voting for all edge pixels so as to determine the first estimate of the pitch and/or roll angle related information based on the back projected edge pixels.

The first pitch and/or roll angle related estimate obtaining element is in one option further arranged to determine the first horizon estimate based on the back projected edge pixels.

In one option, the first pitch and/or roll angle related estimate obtaining element is arranged to extract those edge pixels which are within a determined range from the first horizon estimate and to project the extracted edge pixels onto the unit sphere so as to provide an updated first horizon estimate. The improved pitch and/or roll angle related estimate obtaining element is then arranged to adjust the first estimate of the pitch and/or roll angle related information based on a relation between the updated first horizon estimate and the second horizon estimate so as to determine the improved estimate of the pitch and/or roll angle related information.

One embodiment of the present disclosure relates to a computer program for executing the steps of the method for estimating information related to a vehicle pitch and/or roll angle according to the above.

DETAILED DESCRIPTION OF VARIOUS EMBODIMENTS

Figure 1:
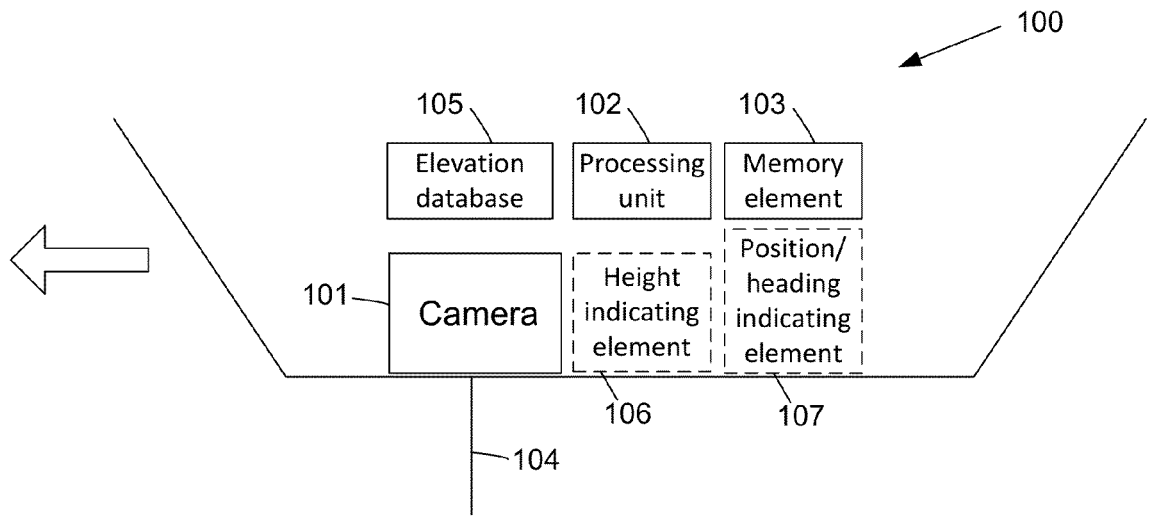
FIG. 1 illustrates schematically an example of an airborne vehicle.

In FIG. 1, an airborne vehicle 100 comprises a camera 101. The camera is arranged to capture at least one image. In one example, the camera is arranged to continuously capture images of a scene. A processing unit 102 is in one example arranged to determine a vehicle pitch and/or roll angle related information. In one example the vehicle pitch and/or roll angle related information comprises a vehicle pitch and/or a vehicle roll value. In one example the vehicle pitch and/or roll angle related information comprises information transformable to a vehicle pitch and/or a vehicle roll value. The processing unit 102 is arranged to operate in cooperation with at least one memory element 103. The at least one memory element 103 comprises a software algorithm arranged to be executed by the processing unit 102. The at least one memory element 103 is also arranged to store data used by the processing unit 102. In one example (not shown) at least part of the processing unit 102 and/or the at least one memory element 103 is located outside the airborne vehicle. In one example, the camera is mounted on the outside of the aircraft.

In one example, the camera 101 is mounted with its optical axis 104 vertically down. However, the camera 101 can be mounted with its optical axis in other directions.

In one example, the camera is an omni-directional camera. The omni-directional camera should have a field of view, FOV, such that it is ensured that at least part of the horizon can be seen irrespective of the airborne vehicle tilt angle assuming that it is at sufficient height, i.e. above trees and buildings. In one example, the omni-directional camera has a field of view, FOV, larger than 180 degrees. The omni-directional camera has in one example at least one omni-directional lens. In one example, the at least one omni-directional lens is a fish-eye lens.

In one example, the camera is a camera for visual light. In one example, the camera is an IR camera. In one example, a camera set is provided comprising one camera for visual light and one IR camera. Then, that camera can be used which captures the best quality image given the circumstances. For example, during night, an IR camera would work better than a visual image camera. During a sunny day, the visual camera would normally provide the best image.

In one example, the camera(s) is calibrated, i.e. its intrinsic parameters and the distortion parameters are known. The orientation (rotation) of the camera in a vehicle fixed coordinate frame is known. These prerequisites are for example determined pre-flight in lab environment or in an earlier flight.

The airborne vehicle 100 stores an elevation database 105 or has access to the elevation database. In one example, the elevation database 105 comprises a digital elevation model, DEM, of an area around the vehicle.

The digital elevation model could be any kind of 3D model known to those skilled in the art. In one example, the digital elevation model is represented as a mesh. In one example the digital elevation model is represented as a surface representation. In one example the digital elevation model is represented as a voxel representation. In one example the digital elevation model includes texture information. In one example the digital elevation model is a triangular irregular network (tin)-based mesh draped with textures.

The term digital elevation model is used herein. This term is intended to include a digital surface model as well as a digital elevation model without any structures modelled.

The airborne vehicle 100 optionally further comprises a height indicating element 106. The height indicating element 106 is arranged to provide an approximate height for the vehicle at the time of capturing the image. In one example, the height indicating element comprises an air pressure meter. In one example, the height indicating element 106 comprises a GPS receiver or the like providing the three dimensional position of the airborne vehicle in a global coordinate system.

The airborne vehicle optionally further comprises a position and/or heading indicating element 107. The approximate position and heading of the vehicle in global coordinate system, or relative to the elevation database 105, is known. The approximate position and/or heading of the airborne vehicle in the global coordinate system is in one example obtained from GPS and/or object tracking in an image sequence captured onboard the airborne vehicle.

As stated above, the processing unit is arranged to estimate vehicle pitch and/or roll angle related information. Processing involves determining a first estimate of the pitch and/or roll angle related information and determining an improved pitch and/or roll related estimate based on the first estimate, the image(s) captured by the camera and the digital elevation model.

Figure 2:
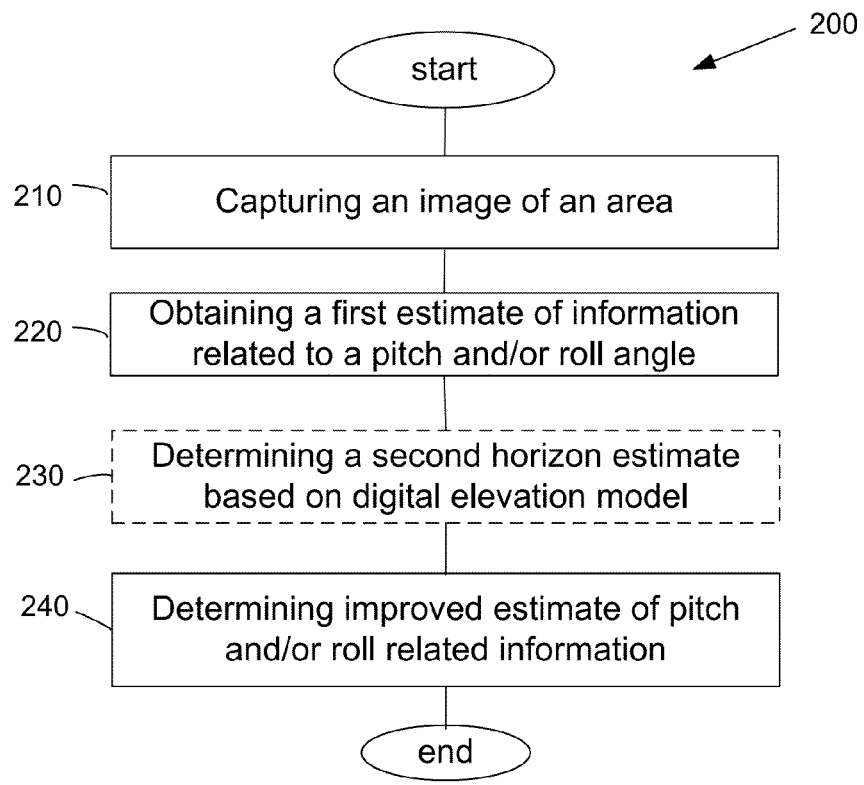
FIG. 2 is a flow chart illustrating an example of a method for estimating vehicle pitch and/or roll angle related information in an airborne vehicle.

In FIG. 2, a method 200 for estimating information related to a vehicle pitch and/or roll angle is illustrated. The method comprises a step of capturing 210 an image of an area covering at least a part of the horizon using a camera mounted on the airborne vehicle, obtaining 220 a first estimate of the pitch and/or roll angle related information, and determining 240 an improved estimate of the pitch and/or roll related information based on the first estimate, the image and a digital elevation model. In one example, the step of capturing 220 an image is performed in parallel or after the step of obtaining 210 a first estimate of the pitch and/or roll angle related information.

In one example, the first estimate of the pitch and/or roll angle related information is obtained 220 based on a first horizon estimate, wherein the earth is assumed to be spherical with no topography.

In one example, the step of obtaining 220 the first estimate comprises obtaining a first horizon estimate based on the captured image.

In one example, the method comprises a step of determining 230 a second horizon estimate based on the digital elevation model. The step of determining 240 the improved pitch and/or roll estimate is then based on the determined second horizon estimate. The step of determining 240 an improved estimate of the pitch and/or roll related information comprises in one example adjusting the first estimate of the pitch and/or roll related information based on a relation between the first horizon estimate and the second horizon estimate.

Figure 3:
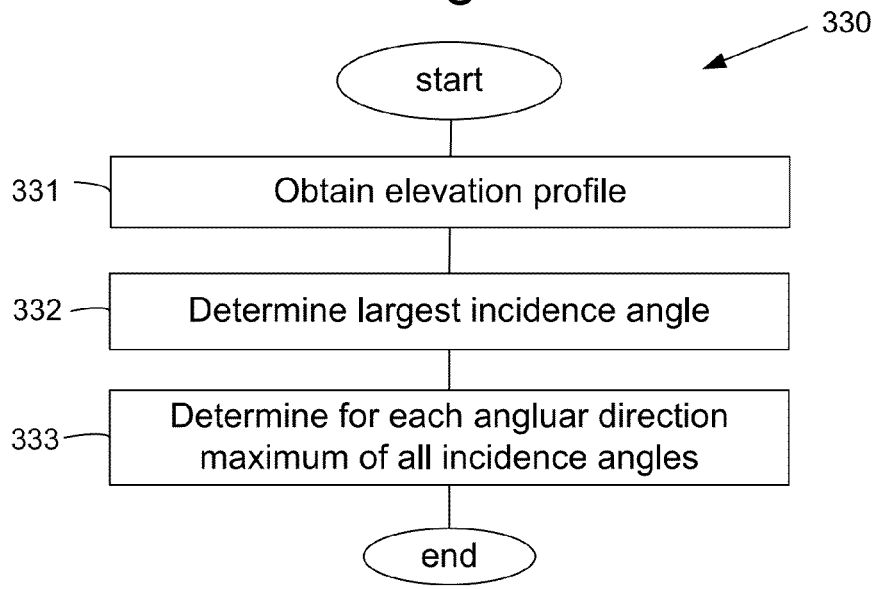
FIG. 3 is a flow chart illustrating an example of a step for determining a second horizon estimate based on a digital elevation model.

In FIG. 3, one example of performing a step of determining 330 a second horizon estimate based on the digital elevation model is described. The determination of the second horizon estimate comprises in this example the following. In a first step, an elevation profile for the airborne vehicle is obtained 331 in a plurality of directions around the airborne vehicle. In one example this involves obtaining a global three dimensional position for the vehicle/camera. The three dimensional position is in one example obtained from height indicating element and/or a position and/or heading indicating element onboard the vehicle or using an image-based method. If GPS position information is not available, the accuracy of the three dimensional position is in one example known with a lower accuracy in at least one dimension. In one example, the accuracy in a XY-plane is in the range of tens of meters. If the max height in a flight is 600 m, the distance to the ideal horizon is around 100 km. The ideal horizon is defined as a horizon determined based on the assumption that the earth is spherical with no topography. To have some margin, height profiles up to 200 km away from the vehicle are in one example obtained. Based on the vehicle/camera three dimensional position, the height profile in all angular directions $\alpha_i$ around the vehicle is extracted from the DEM. For each direction, the elevation profile is obtained at a predetermined interval. In one example, the predetermined interval is within the same range as the resolution in the digital elevation model, DEM, used. In one example, bilinear interpolation is used to find the elevation between grid points in the digital elevation model.

In a next step, the largest incidence angle on the camera is determined 332, which is generated by all land objects at heights and distances given by the obtained elevation profile. As it would be computationally demanding to compute ray paths between all objects along the elevation profile and the camera online, in one example, look-up tables are used to find the incidence angle on the camera for all land objects along the elevation profile. One example of generation of look-up tables will be described later. In an alternative example, an extensive search is used to find the incidence angle on the camera for all land objects along the elevation profile. There are a plurality of methods known in the art for finding the incidence angle on the camera for all land objects along the elevation profile. Below, the search is described in relation to a look-up table. In a next step, a maximum of all incidence angles along the elevation profile, denoted $\xi_{max}$ are determined 333 to be the geometrical horizon point for the angular direction $\alpha_i$ where the elevation profile is valid. This is repeated for all angular directions $\alpha_i$ in the XY plane. Thereby, a geometrically computed horizon comprises i points each given as $$P_{geom,i} = [\cos\alpha_i \sin\alpha_i \cos(\pi-\xi_{max,i})]^T$$

Different examples related to generation of look-up tables are described below. In one example, the determining 332 of the largest incidence angle on the camera, that is generated by all land objects at heights and distances given by the obtained elevation profile is performed based on a look-up table comprising information related to incidence angles on the camera for substantially all objects along the elevation profile. In one example the input parameters comprise camera three dimensional position and/or object height and/or distance from the camera. In one example, the output parameter is the incidence angle on the camera. This procedure may be performed for a plurality of sets of input parameters. Especially, the procedure may be performed for a plurality of possible three dimensional positions.

Increments are selected for each input parameter. In one example the increment for the camera height parameter is 2 meters. In one example the increment for the object height is 2 meters. In one example the increment for the distance from the camera is 100 meters.

The digital elevation model, DEM, has a predetermined XY grid resolution. In one example, the increments for the input parameters are in the same order as the digital elevation model resolution. In one example, the resolution is 3 arcseconds or around 90 m at the equator.

Figure 7:
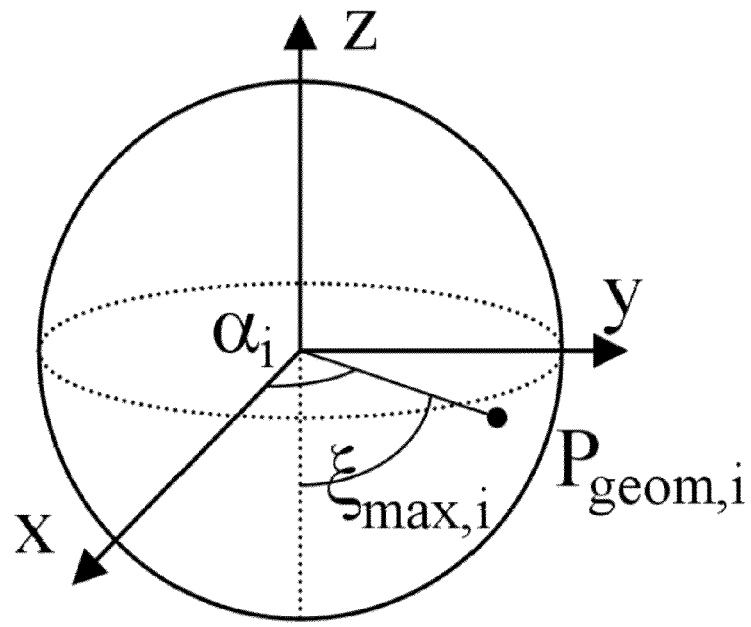
FIG. 7 illustrates a principle for determining a geometrically computed horizon.
Figure 8:
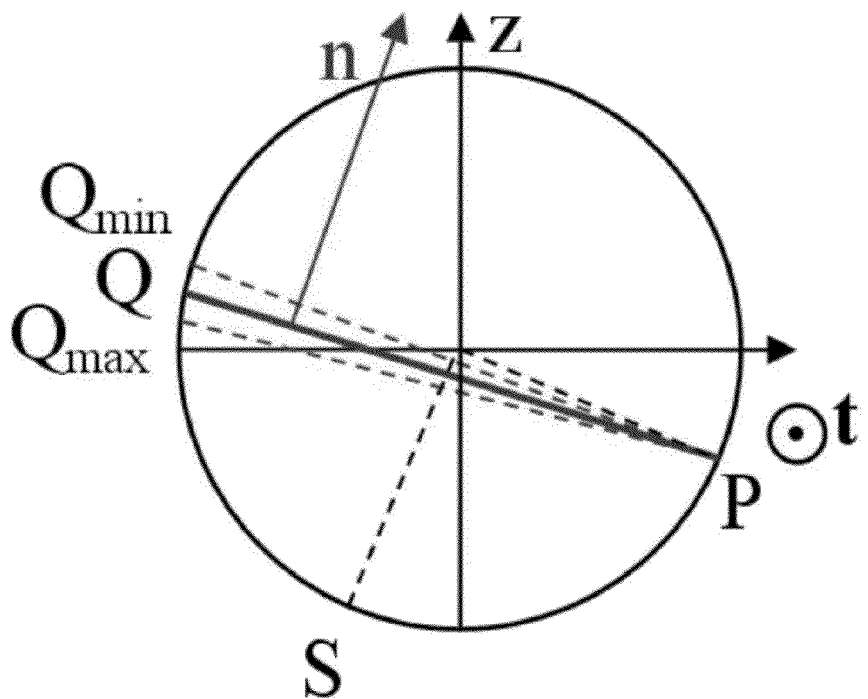
FIG. 8 illustrates an example of estimating a horizon normal.

In FIG. 7, a principle for determining a second, geometrically computed horizon estimate comprising i points $P_i$ as given in the equation $P_{geom,i} = [\cos\alpha_i \sin\alpha_i \cos(\pi-\xi_{max,i})]^T$ is illustrated. In the figure, the camera three dimensional position is represented as the origin of the coordinate system. The z-axis represents height. The x- and y-axes are defining a ground plane. In the illustrated example, $\alpha_i$ represents an angular direction to point $P_i$ in the XY plane. In the illustrated example, the XY plane angular direction $\alpha_i$ is given in relation to the x-axis. In the illustrated example, $\alpha_i$ represents an angular direction to point $P_i$ in the XY plane. $\xi_{max,i}$ represents the largest incidence angle on the camera that is generated by all land objects at heights and distances given by an extracted elevation profile. In the illustrated example, the largest incidence angle $\xi_{max,i}$ represents an angle between the z-axis and a line between the origin and point $P_i$.

Figure 4:
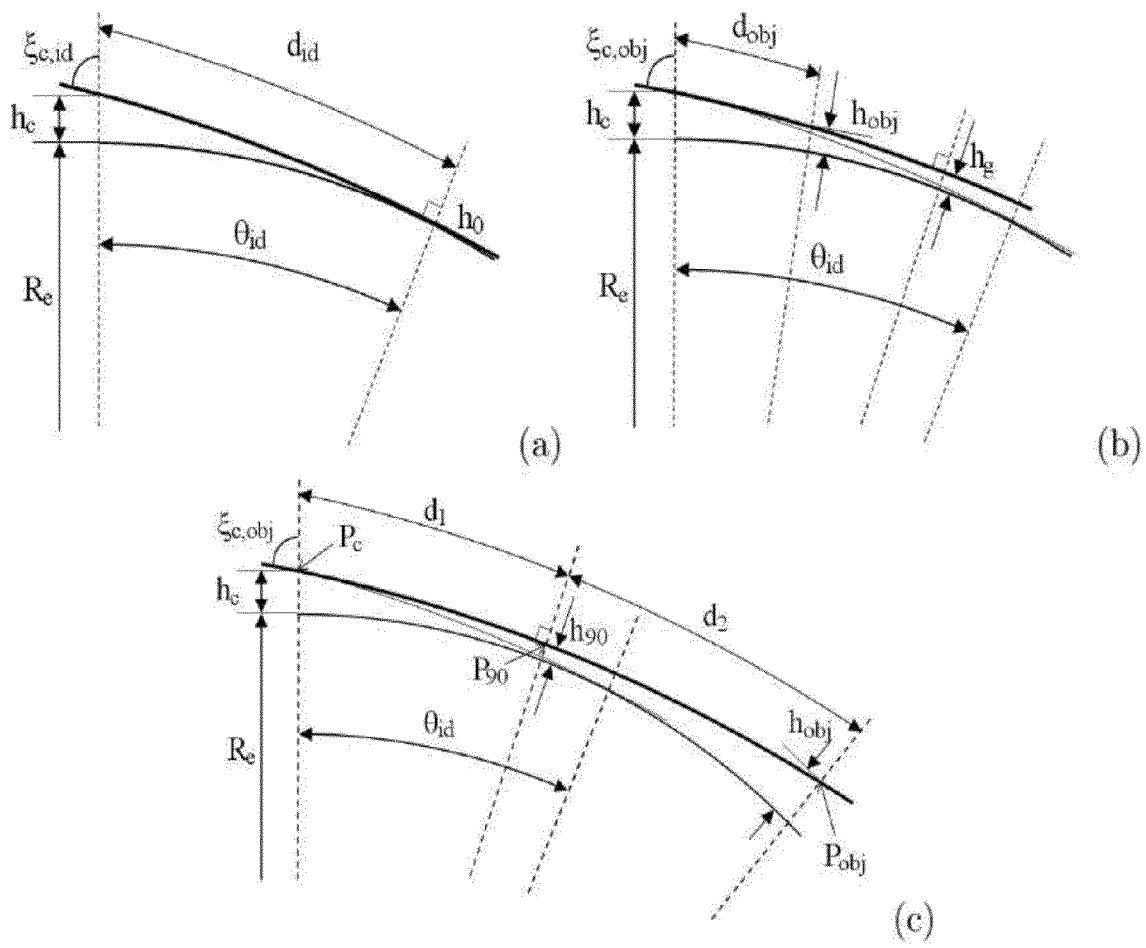
FIG. 4 illustrates schematically a principle for forming a look-up table for obtaining information related to an incidence angle on a camera.

In FIG. 4, a principle for obtaining incidence angles to use for example in a look-up table comprising at least one of the input parameters: camera three dimensional position or height, object height, and distance from the camera, is illustrated by means of an example.

In FIG. 4a, a refracted ray path is represented with ideal horizon at sea level $h_0$. FIG. 4b represents a refracted ray above ideal horizon passing an object at height $h_{obj}$ located the distance $d_{obj}$ from the camera. FIG. 4c represents a refracted ray above ideal horizon passing an object at height $h_{obj}$ located beyond the ideal horizon.

In detail, for a spherically stratified model, an angle $\theta_c$ from a ground point at height $h_g$ to a camera at height $h_c$ is given by $$\theta_C = \int_{h_g}^{h_c} \frac{k}{r\sqrt{n^2 r^2 - k^2}} dr.$$

The subscripts c and g denote the camera and the ground, respectively, and n denotes the refractive index.

The stratified model comprises a model of the refractive index n as a function of the height h. The model comprises thin radial layers of thickness $\Delta r$ with constant refractive index n. The stratified model determines the refracted ray path from the ideal horizon at sea level up to the camera at height $h_c$.

For a thin layer i with constant refractive index $n_i$ in the spherically stratified model, the integral above may be expressed as $$\theta_{C_i} = \int_{h_i}^{h_{i+1}} \frac{k/n_i}{r\sqrt{r^2 - (k/n_i)^2}} dr = \cos^{-1}\left(\frac{k}{n_i r_i + 1}\right) - \cos^{-1}\left(\frac{k}{n_i r_i}\right),$$

The camera height $h_c$ is set constant, for example within the range 200 m to 600 m.

In FIG. 4a, it is assumed that the earth is spherical with no topography. The perceived horizon will then be at sea level, i.e. at height $h_0=0$. At the horizon, the incidence angle is $\xi_0=\pi/2$. The equation above is used to compute angular increments $\theta_{c_i}$ for each layer of thickness dr up to the height $h_c$. Adding these incremental steps will yield the distance to the ideal horizon $$d_{id}(h_c) = \sum_{h_i=0}^{h_c} \theta_{c_i} r_i.$$

The corresponding incidence angle on the camera $\xi_{id}(h_c)$ are computed from a model as a sphere with a radius $R_e$ and a ground topography overlaid on this sphere. For refracted ray propagation in the atmosphere around the earth, the above described spherically stratified model is used. The model determines the refracted ray path from the ideal horizon at sea level up to the camera at height $h_c$. If there would be no topography on a spherical earth with radius $R_e$, this ray path would give the perceived horizon.

The true perceived horizon (sky/ground boundary) may be shifted in the image compared to the ideal horizon for two reasons. The first reason is that there is a land object at higher height than the ray path within the distance to the ideal horizon. The second reason is that there is a land object further away than the distance to the ideal horizon, but at sufficient height to be perceived at an incidence angle above the ideal horizon.

In FIG. 4b, a first case illustrates the effect of high objects within distance to ideal horizon. To compute this effect, a ground height $h_g$ between 0 and $h_c$ is considered. The incidence angle at the ground object is set to $\xi_g=\pi/2$. The ray path is computed in the same manner as above until it reaches the height $h_c$. Data points from the ray path are extracted at desired land object heights $h_{obj}$ and the corresponding distances to the camera $d_{c, obj}$ and the ray incidence angle on the camera $\xi_{obj}$. The computations for all ground heights $h_g$ are repeated from 0 to $h_c$ in steps $\Delta h_g$.

In FIG. 4c, a second case illustrates the effect of high objects beyond distance to ideal horizon. Even if an object is further away from the camera than the distance to the ideal horizon, the object may shift the sky/ground limit from the ideal case. The ray from the camera may take a path as in FIG. 4c, where the ray starts at point $P_{obj}$, lowers in height from the ground object until it reaches the incidence angle $\pi/2$ at point $P_{90}$ and then increases in height again until it reaches the camera at point $P_c$. To compute this effect, we start with a ray at height $h_{90}$ and set the incidence angle $\xi_{90}=\pi/2$. We compute the ray path up to the maximum of the camera height $h_c$ and the highest object height $h_{obj, max}$ in the digital elevation model, DEM. From this ray path, the distance to the camera $d_1$ from $P_{90}$ and the corresponding ray incidence angle on the camera $\xi_{c,obj}$ is extracted. From the ray path on the right side of $P_{90}$, the distances $d_2$ to the desired object heights $h_{obj}$ are extracted. The distances $d_1$ and $d_2$ are summed to obtain the total distance $d_{obj}$ from the camera to the object at height $h_{obj}$. The total distance $d_{obj}$ is recorded together with the corresponding incidence angle $\xi_{obj}$. The computations are repeated for the height $h_{90}$ from 0 up to $h_c$.

From the first and second cases of FIGS. 4b and 4c, a point set with incidence angles and distances from the camera to the object can be extracted for each camera height $h_c$ and object height $h_{obj}$. This point set is resampled to obtain incidence angles at the desired step size for the distance. In one example the step size is every 100 m up to 200 km. In one example, the look-up table is then generated. Input parameters to the exemplified look-up table are then camera three dimensional position, object height, distance from camera and the output parameter is the incidence angle on the camera.

In this example, objects that are at a higher height than the camera and within a distance that is shorter than the distance to the ideal horizon have not been taken into account. If flying in valleys in a mountainous area, it would be necessary to take this into account.

Figure 5:
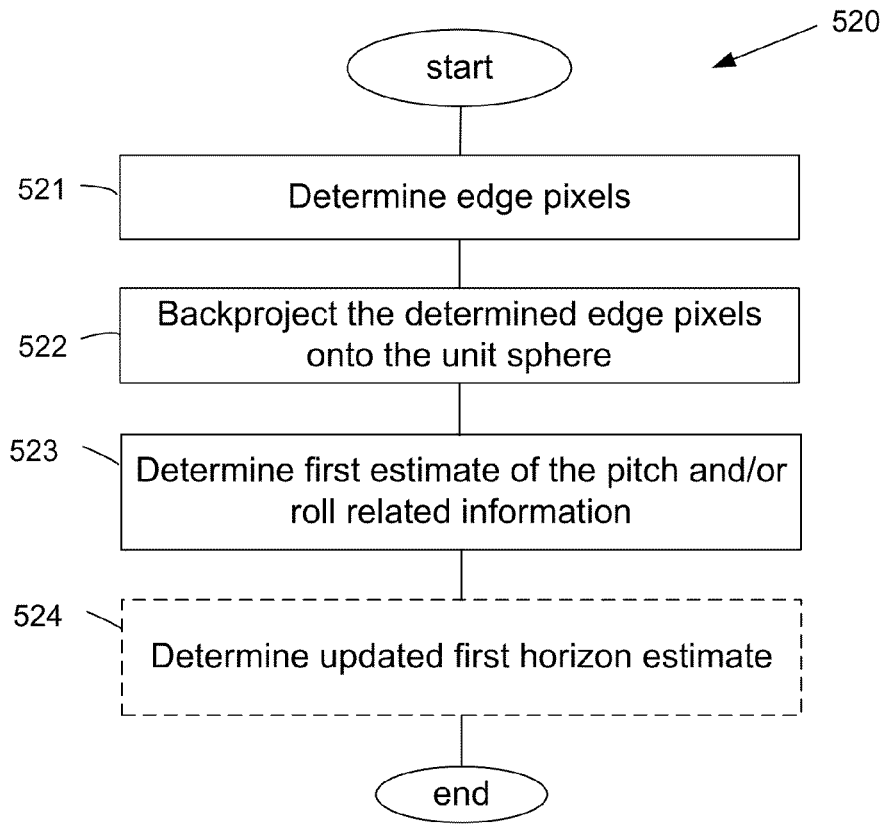
FIG. 5 is a flow chart illustrating an example of a step for obtaining a first estimate of information related to pitch and/or roll angle.

In FIG. 5, a step of obtaining 520 a first estimate of information related to pitch and/or roll angle.

The method comprises a step of back projecting 522 determined edge pixels in the image onto the unit sphere. Thereafter, the first estimate of the pitch and/or roll angle related angle is determined 523 based on the back projected edge pixels. Further, in one example, an updated first horizon estimate is determined 524 based on the back projected edge pixels.

The method comprises in one example determining 521 edge pixels in the image that are within a predetermined distance from a horizon line in the image.

The step of determining 521 edge pixels comprises in one example applying an edge detector in the input image. Several edge detectors are available in the literature. For example, the Canny detector is a suitable choice. An edge direction for the respective determined edge pixel is in one example also determined.

The step of back projecting 522 the determined detected edge pixels onto the unit sphere comprises, in one example projecting each edge pixel onto the unit sphere. In one example, an estimated pitch and/or roll angle proposed by the respective edge pixel is computed given an assumed height, measured edge direction and assuming a spherical earth with no topography.

The step of determining 523 the first estimate of the pitch and/or roll related information based on the back projected edge pixels comprises in one example performing probabilistic voting such as probabilistic Hough voting for all or a subset of the edge pixels. The votes from the edge pixels in a Hough voting scheme are accumulated. A cell with the highest voting score gives the first estimate of the pitch and/or roll angle related information. Further, a first horizon estimate is determined based on the first estimate of the pitch and/or roll angle related information. Determining the first horizon estimate involves projecting horizon pixels on the image plane using the camera calibration. Thus the determining of the first horizon estimate forms an inverse of the back projection made in the back projecting step 522.

Figure 9:
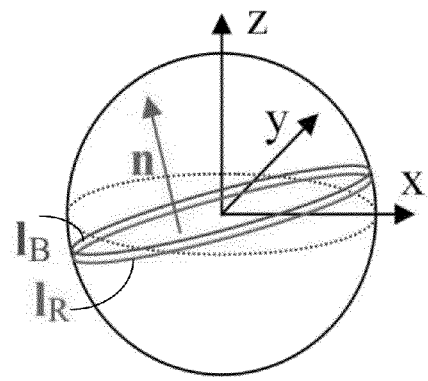
FIG. 9 illustrates an example of a band on the unit sphere with conceivable true horizon edge pixels.

The step of determining 524 an updated first horizon estimate based on the back projected edge pixels comprises in one example extracting those edge pixel which are within a determined range around the first horizon estimate and projecting the extracted edge pixels onto the unit sphere so as to obtain the updated first horizon estimate. The range is in one example defined by a number of pixels in the image. The determined range is for example pixels within a range of maximum of 10 pixels away from the first horizon estimate. In an alternative example, the determined range is 1 pixel away. The range is in one example defined as an angular band on the unit sphere (FIG. 9). In one example the determined range is 0.5°.

In detail, given the first estimate of the pitch and/or roll angle related information, all detected edge pixels that are within the determined range, for example 1 pixel from the estimated horizon line on the image are used. Thereafter, all edge pixels within the determined range from the estimated horizon line on the image are back projected onto the unit sphere given the calibrated camera parameters. The points on the unit sphere are transformed in accordance with the estimated pitch and roll angles and the heading angle. Thereby, the updated first horizon estimate is obtained.

Obtaining of an improved estimate of pitch and/or roll related information comprises then in one example adjusting the first estimate of the pitch and/or roll related information based on a relation between the first horizon estimate or the updated first horizon estimate, and a second horizon estimate.

In detail, in one example, the maximum perceived incidence angle on the camera (unit sphere) for all azimuth angles in the XY plane is then determined based on the approximate three dimensional position, heading and height height of the vehicle/camera, the digital elevation model and possibly the look-up table, so as to obtain the second horizon estimate. Thereafter, the first estimate of the pitch and/or roll related information is refined/adjusted by minimizing the distance between the back projected and transformed image points and the geometrically determined points. The estimated vehicle pitch and roll angle is the result after the refinement.

Figure 6:
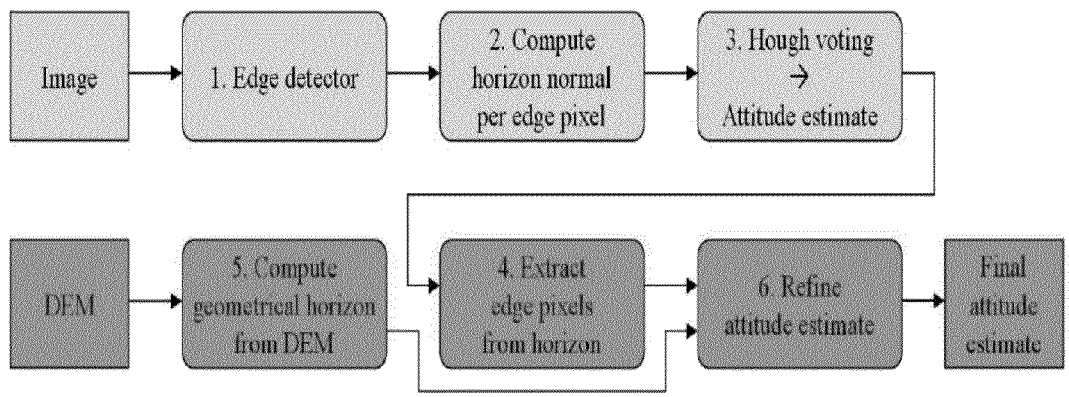
FIG. 6 is a flow chart overview illustrating an example a flow of estimating vehicle pitch and/or roll angle related information in an airborne vehicle.

FIG. 6 illustrates an example of a flowchart overview. The flow chart comprises six steps. Steps 1-3 relate to obtaining a first estimate of the information related to a pitch and/or roll angle while steps 4-6 relate to refinement steps for obtaining an improved estimate of the information related to a pitch and/or roll angle.

1. Run an edge detector on the input image. A Canny detector is in one example chosen. The Canny detector is robust and known to give no systematic offset in edge location.

2. Estimation of the horizon normal vector on the unit sphere for each edge pixel. Project the edge pixel onto the unit sphere. The edge pixel direction on the image plane is projected as a tangent vector on the unit sphere. For a known vehicle height, the radius for the horizon on the unit sphere is deterministic. Combining this information, the horizon normal vector, i.e. the vehicle attitude, can be estimated for each edge pixel.

3. Probabilistic Hough voting (Hough, 1962) for all edge pixels to estimate the vehicle attitude (pitch and roll angles) and the horizon in the image. The voting allows the use of probability density functions for the vehicle height, and pitch and roll angles to make the voting more robust.

4. Extract edge pixels close to the estimated horizon on the image plane and project the extracted horizon edge pixels onto the unit sphere.

5. Compute the geometrical horizon on the unit sphere from a digital elevation model using an approximate vehicle position and heading as input.

6. Refine the estimated vehicle attitude from step 3 by minimizing the distance between the perceived horizon pixels from step 4 with the geometrically computed horizon from step 5.

The first, edge detecting step comprises in one example at least some of the following features. Before applying the Canny detector, the colour image is in one example converted to greyscale. The image is in one example smoothed. In one example the smoothing is performed using a Gaussian kernel. To reduce subsequent unnecessary computations in the Hough voting, in one example, edge pixels originating from the fisheye circle and/or aircraft structure are removed.

The second step of estimating a horizon normal vector is illustrated in FIG. 7. The second step comprises in one example at least some of the following. For an image edge pixel $p=(x,y)$, the projection onto the unit sphere is at point P. The gradient is computed in p, and the edge direction is defined in p as $(-V_y, V_x)$, i.e. normal to the gradient. The image point $p_e$ is defined as the point one pixel away from p along the edge direction. The projection of $p_e$ onto the unit sphere is at $P_e$. If p is a horizon point, the vector $\overrightarrow{PP_e}$ vector is a tangent vector on the unit sphere lying in the plane of the projected horizon. Let t be a vector of unit length in the direction of $\overrightarrow{PP_e}$. In a cross section of the unit sphere, orthogonal to the vector t, we search for a second point Q in the plane of the horizon. For a certain height $h_c$, the radius of the horizon circle on the unit sphere is known. To find Q, we define the vector $$\overrightarrow{OS} = \overrightarrow{OP} \times t$$

where O is the origin in the unit sphere. We then obtain the vector $$\overrightarrow{OQ} = \overrightarrow{OP} \cos 2\xi_c + \overrightarrow{OS} \sin 2\xi_c,$$

where $\xi_c$ is the incidence angle from the horizon for a camera at height $h_c$. At this stage, we assume that the earth is smooth with radius $R_e$. The points $Q_{max}$ and $Q_{min}$ denote the horizon points for the maximum and minimum heights given the probability distribution $p_h$ for the camera height in the subsequent voting.

A unit normal vector $\hat{n}$ to the horizon plane can now be obtained as $$\hat{n} = \frac{\overrightarrow{PQ} \times t}{\left\| \overrightarrow{PQ} \times t \right\|_2}.$$

The pitch and roll angle estimates for the edge point p are then given by $$\theta = \arcsin \hat{n}_y, \quad \phi = -\arctan \frac{\hat{n}_x}{\hat{n}_z}.$$

The third step of performing Probabilistic Hough voting comprises in one example at least some of the following. For each edge pixel p, we have shown how to compute the estimated pitch and roll angles for the horizon plane, given an assumed height h. The accumulator cells in the Hough voting is chosen as a pitch and roll angle grid. In the probabilistic Hough voting scheme, the weight w for each vote is proportional to the likelihood that the edge pixel is a horizon pixel given the probability distributions $p_h$, $p_\theta$ and $p_\phi$ for $h_c$, $\theta$ and $\phi$. Thus, $$w(x,y) \propto \iiint p(x,y|h,\theta,\phi) d\phi d\theta dh$$

The height can be measured either with a GPS or using an air pressure meter onboard the vehicle.

Using Bayes' theorem and assuming that the probability distributions for $h_c$, $\theta$ and $\phi$ are independent, the weights may be calculated as $$w(x,y) \propto \int p_h(h) dh \int p_\theta(\theta) d\theta \int p_\phi(\phi) d\phi = w_h w_\theta w_\phi$$

For each edge pixel p, the estimated pitch and roll angles for each height h is computed. A weighted vote is in one example given in the nearest neighbour pitch-roll cell in the accumulator array.

In order to suppress local maxima, the values in the accumulator array are in one example convolved with a Gaussian kernel. The index for the cell with maximum score is then picked as the attitude estimate.

The fourth step of extracting horizon edge pixels comprises in one example at least some of the following.

After step three, there may be present significant attitude estimate errors due to nonflat true horizon lines and further refinement becomes necessary. To prepare for the refinement of the attitude estimate, only the edge pixels originating from the horizon in the image are to be extracted. In one example, this is performed geometrically. Edge pixels close to the estimated horizon from the Hough voting are then extracted. For a calibrated camera and knowledge of the camera height, the ellipse on the image plane corresponding to the estimated horizon from the Hough voting will always be slightly smaller than the true perceived horizon on the image due to the topography on top of the ideal spherical earth. Thus, most of the true horizon edge pixels will be on or outside the estimated horizon. Due to quantization effects in the edge detector, some true horizon edge pixels may be ½ pixel inside the estimated horizon. If the shift of the horizon due to topography is less than 1 pixel, it is sufficient to project the estimated horizon on the image plane and extract all edge pixels that are within a 3×3 matrix from the horizon pixels on the image plane.

For high resolution images, and when the ground elevation in the scene is large, the shift of the horizon due to topography may be larger than 1 pixel. The shift from the ideal horizon is in one example in the order 4-5 pixels. To extract all true horizon edge pixels, the angular shift on the unit sphere generated by the highest elevation in the surrounding area compared to sea level is computed. The upper angular limit is herein denoted $\beta_{lim}$. This means that all true horizon pixels on the image will be projected onto the unit sphere in a band above the estimated horizon as given by the probabilistic Hough voting. This will be illustrated in FIG. 9.

The fifth step, computing the geometric horizon comprises in one example at least some of the following. For all extracted edge pixels in the fourth step, project the edge pixels onto the unit sphere. Denote this set of edge pixels $P_s$. Rotate the point set with the transpose of the estimated rotation matrix for the vehicle from the Hough voting and denote the rotated point set $P_r$.

$$Pr = R_{est}^T Ps$$

The rotated point set on the unit sphere will ideally be the horizon edge pixels rotated to a coordinate system aligned with the world coordinate system. The azimuth angles $\alpha_i$ for all rotated edge pixels in $P_r$ are computed as $$\alpha_i = a\tan(Pr_{y,i}/Pr_{x,i}).$$

Based on the assumed 3D position for the vehicle, elevation profiles are extracted from the digital elevation model in all directions $\alpha_i$. For each direction $\alpha_i$, the maximum incidence angle $\xi_{max,i}$ on the camera is determined based on the elevation profile and the look-up table. This will generate the geometrically computed horizon $$P_{geom,i} = [\cos\alpha_i \ \sin\alpha_i \ \cos(\pi - \xi_{max,i})]^T$$

The sixth step, refining the pitch and/or roll angle estimates comprises in one example at least some of the following. The pitch and/or roll angles are refined by minimizing the distance between the point set $P_r$, the rotated back projected horizon edge pixels, and the point set $P_{geom}$, the geometrically computed horizon.

In FIG. 9, a band on the unit sphere with conceivable true horizon edge pixels is illustrated. In FIG. 9, a line denoted $I_R$ in the figure is the estimated horizon. A line denoted $I_B$ is generated by points that make an angle $\beta_{lim}$ with the horizon points. The line $I_R$ is defined by the following equations.

$$I_s = \{x_s | x_s^2 + y_s^2 + z_s^2 = 1 \wedge z_s = \cos(\pi - \xi(h_c))\}$$

$$I_R = \{x_R | x_R = R(\theta_{est}, \phi_{est})x_s, x_s \in I_s\}$$

The line $I_s$ is the projection of the horizon onto the unit sphere for a vertically oriented camera at height $h_c$ where $\xi(h_c)$ is the corresponding incidence angle on the camera. The line $I_s$ is then rotated with the estimated pitch and roll angles.

The line $I_B$ is defined by the following equations.

$$I_{sh} = \{x_{sh} | x_{sh}^2 + y_{sh}^2 + z_{sh}^2 = 1 \wedge z_{sh} = \cos(\pi - \xi(h_c) - \xi_{lim})\}$$

$$I_B = \{x_B | x_B = R(\theta_{est}, \phi_{est})x_{sh}, x_{sh} \in I_{sh}\}$$

Compared to $I_s$, the line $I_{sh}$ is shifted an angle $\beta_{lim}$ upwards on the unit sphere. In one example the band between the lines $I_R$ and $I_B$ is projected onto the image plane to create a mask for potential horizon edge pixels. From the Canny edge image, only the edge pixels within the mask are extracted for the subsequent attitude refining process.

Figure 10:
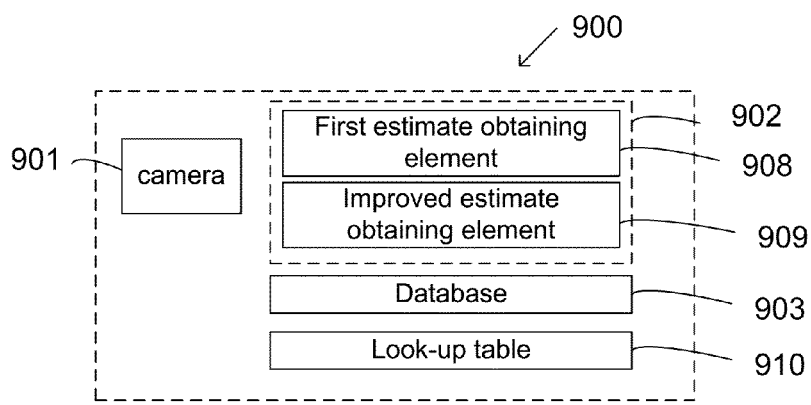
FIG. 10 is a block scheme schematically illustrating an example of a system for estimating vehicle pitch and/or roll angle related information in an airborne vehicle.

In FIG. 10, a system 900 for estimating information related to a vehicle pitch and/or roll angle is illustrated. The system 900 comprises a processing unit 902 having a first pitch and/or roll angle related estimate obtaining element 908 arranged to obtain a first estimate of the information related to the pitch and/or roll angle. The processing unit 902 further comprises an improved pitch and/or roll angle related estimate obtaining element 909 arranged to determine an improved estimate of the information related to the pitch and/or roll angle. The system comprises further at least one camera 901 mounted on the airborne vehicle. The at least one camera is arranged to capture an image of an area covering at least a part of the horizon. The camera is in one example an omni-directional camera. The system comprises further a database 903 arranged to store a digital elevation or surface model. The improved estimate pitch and/or roll angle related obtaining element 909 is arranged to determine the improved estimate of the information related to the pitch and/or roll angle based on the first estimate of the pitch and/or roll angle related information, and the digital elevation model.

The first pitch and/or roll angle related estimate obtaining element 908 is in one example arranged to obtain the first estimate of the pitch and/or roll angle related information based on a first horizon estimate. In one example, the first horizon estimate is based on an assumption that earth is spherical with no topography. The first estimate is in one example obtained from the image.

The improved pitch and/or roll angle related estimate obtaining element 909 is in one example arranged to obtain a second horizon estimate based on the digital elevation model, and to determine the improved estimate of the pitch and/or roll angle related information based on the obtained second horizon estimate. In detail, the improved pitch and/or roll angle related estimate obtaining element 909 is in one example arranged to determine the second horizon estimate by: extracting the elevation profile in all angular directions $\alpha_i$ around the vehicle from the digital elevation model based on a vehicle XY position, determining the largest incidence angle on the camera, that is generated by all land objects at heights and distances given by the extracted elevation profile, and determining for each angular direction $\alpha_i$ the maximum of all incidence angles along the elevation profile to be the geometrical horizon point where the elevation profile is valid.

In one example, the maximum of all incidence angles along the elevation profile is determined for each angular direction $\alpha_i$ is determined based on an extensive search. The system comprises in one example a look-up table 910. The look-up table comprises information related to incidence angles on the camera for substantially all objects along the elevation profile. In one example, the look-up table 910 comprises input parameters related to camera height, object height and/or distance from the camera; and an output parameter related to incidence angle on the camera.

In one example, the first pitch/roll angle related estimate obtaining element 908 is arranged to obtain a first horizon estimate based on the captured image. The improved pitch/roll angle related estimate obtaining element 909 is arranged to adjust the first estimate of the pitch and/or roll related information based on a relation between the first horizon estimate and the second horizon estimate so as to determine the improved estimate.

In one example, the improved pitch and/or roll angle related estimate obtaining element 909 is arranged to determine a plurality of candidate second horizon estimates. In one example, each candidate second horizon estimate is related to a candidate camera and/or vehicle three dimensional position. The determination of the improved estimate of the information related to the pitch and/or roll angle then involves selecting that candidate second horizon estimate which provides a best fit between the first horizon estimate and the second horizon estimate.

The first pitch and/or roll angle related estimate obtaining element 908 is arranged to back project the determined edge pixels onto the unit sphere, and determine the first estimate of the pitch and/or roll related information based on the back projected edge pixels.

The first pitch and/or roll angle related estimate obtaining element 908 is in one example arranged to perform probabilistic voting such as probabilistic Hough voting for all edge pixels so as to determine the first estimate of the pitch and/or roll related information based on the back projected edge pixels.

The first pitch and/or roll angle related estimate obtaining element 908 is in one example further arranged to determine the first horizon estimate based on the back projected edge pixels.

The first pitch and/or roll angle related estimate obtaining element 908 is further arranged to extract those edge pixel which are within a determined range from the first horizon estimate and to project the extracted edge pixels onto the unit sphere so as to provide an updated first horizon estimate. The improved pitch and/or roll angle related estimate obtaining element 909 is then arranged to adjust the first estimate of the pitch and/or roll angle related information based on a relation between the updated first horizon estimate and the second horizon estimate so as to determine the improved estimate of the pitch and/or roll angle related information.

The invention claimed is:

1. A method (200) for estimating information related to at least one of a vehicle pitch or roll angle, the method comprising the steps of:
    obtaining (220; 520) a first estimate of the information related to at least one of the pitch or roll angle;
    capturing (210) an image of an area covering at least a part of the horizon using a camera mounted on an airborne vehicle; and
    determining (230, 240) an improved estimate of the information related to at least one of the pitch or roll angle based on the obtained first estimate of the information related to at least one of the pitch or roll angle, a digital elevation model, and a horizon in the captured image.

2. A method according to claim 1, wherein the camera is an omni-directional camera.

3. A method according to claim 1, wherein the first estimate of the information related to the at least one of pitch or roll angle is obtained (210; 510) based on a first horizon estimate, wherein the earth is assumed to be spherical with no topography.

4. A method according to claim 3, further comprising a step of obtaining (230) at least one second horizon estimate based on the digital elevation model, wherein the determination of the improved estimate of the information related to the pitch and/or roll angle estimate is based on the obtained at least one second horizon estimate and preferably the first horizon estimate.

5. A method according to claim 4, wherein the step of obtaining the at least one second horizon estimate comprises the following steps:
    obtaining (331) respective elevation profiles for a plurality of angular directions $\alpha_i$ around the airborne vehicle from the digital elevation model based on an airborne vehicle and/or camera three dimensional position;
    determining (332) the largest incidence angle on the camera, that is generated by all land objects at heights and distances given by an extracted elevation profile; and
    determining (333) for each angular direction $\alpha_i$ along the respective elevation profile the maximum of all incidence angles to be the geometrical effective horizon point.

6. A method according to claim 4, wherein:
    a plurality of candidate second horizon estimates are determined each related to at least one of a candidate camera or vehicle three dimensional position; and
    the determination of an improved estimate of the information related to the pitch and/or roll angle involves selecting that candidate second horizon estimate which provides a best fit between the first horizon estimate and the second horizon estimate.

7. A method according to claim 6, wherein the at least one of the camera or vehicle three dimensional position related to the selected candidate second horizon estimate is determined to be the true camera and/or vehicle three dimensional position.

8. A method according to claim 1, wherein the step of obtaining (220) the first estimate of the pitch and/or roll angle related information comprises obtaining a first horizon estimate based on the captured image and wherein the step of determining (240) an improved estimate of the pitch and/or roll angle related information comprises adjusting the first estimate of the pitch and/or roll angle related information based on a relation between the first horizon estimate and a second horizon estimate obtained based on the digital elevation model.

9. A method according to claim 1, wherein the obtaining (220, 520) of the first estimate of the pitch and/or roll angle related information comprises:
    back projecting (522) determined horizon edge pixels in the image onto a unit sphere; and
    obtaining (523) the first estimate of the pitch and/or roll related information based on the back projected edge pixels.

10. A method according to claim 9, wherein the obtaining (523) of the first estimate of the pitch and/or roll related information based on the back projected edge pixels comprises probabilistic voting for all edge pixels.

11. A method according to claim 9, further comprising determining a first horizon estimate based on the back projected edge pixels.

12. A method according to claim 11, further comprising:
    extracting those edge pixel which are within a determined range from the first horizon estimate and projecting the extracted edge pixels onto the unit sphere so as to provide an updated first horizon estimate,
wherein the step of determining an improved estimate of the pitch and/or roll related information comprises adjusting the first estimate of the pitch and/or roll related information based on a relation between the updated first horizon estimate and a second horizon estimate obtained based on the digital elevation model.

13. A computer program product comprising at least one non-transitory computer-readable storage medium having computer-readable program code portions stored therein, the computer-readable program code portions comprising at least one executable portion configured for executing the steps of the method for estimating information related to a vehicle pitch and/or roll angle according to claim 1.

14. A system (900) for estimating information related to a vehicle pitch and/or roll angle, the system comprising:
a processing unit (102; 902) having a first pitch and/or roll angle related estimate obtaining element (908) configured to obtain a first estimate of the information related to the pitch and/or roll angle;
at least one camera (101; 901) mounted on an airborne vehicle, said camera being configured to capture an image of an area covering at least a part of the horizon; and
a database (103; 903) configured to store a digital elevation model;
wherein the processing unit (102; 902) comprises an improved pitch and/or roll angle related estimate obtaining element (909) configured to determine an improved estimate of the information related to the pitch and/or roll angle based on the first estimate of the pitch and/or roll angle related information, the digital elevation model, and a horizon in the image captured by the at least one camera.

15. A system according to claim 14, wherein the camera (101; 901) is an omni-directional camera.

16. A system according to claim 14, wherein the first pitch and/or roll angle related estimate obtaining element (908) is configured to obtain the first estimate of the pitch and/or roll angle related information based on a first horizon estimate, wherein the earth is assumed to be spherical with no topography.

17. A system according to claim 16, wherein the improved pitch and/or roll angle related estimate obtaining element (909) is configured to obtain at least a second horizon estimate based on the digital elevation model, and to determine the improved estimate of the pitch and/or roll angle related information based on the obtained at least one second horizon estimate.

18. A system according to claim 17, wherein the improved pitch and/or roll angle related estimate obtaining element (909) is configured to obtain the camera and/or vehicle three dimensional position related to a selected candidate second horizon estimate as the true camera and/or vehicle three dimensional position.

19. A system according to claim 17, wherein the improved pitch and/or roll angle related estimate obtaining element (909) is configured to determine the at least one second horizon estimate by:
extracting the elevation profile in all angular directions $\alpha_i$ around the airborne vehicle from the digital elevation model based on an airborne vehicle three dimensional position,
determining the largest incidence angle on the camera, that is generated by all land objects at heights and distances given by the extracted elevation profile, and
determining for each angular direction ai the maximum of all incidence angles along the elevation profile to be the geometrical horizon point where the elevation profile is valid.

20. A system according to claim 17, wherein:
the first pitch and/or roll angle related estimate obtaining element (908) is configured to obtain a first horizon estimate based on the captured image; and
the improved estimate obtaining element is configured to adjust the first estimate of the pitch and/or roll angle related information based on a relation between the first horizon estimate and the at least one second horizon estimate so as to determine the improved estimate of the pitch and/or roll angle related information.

21. A system according to claim 14, wherein the first pitch and/or roll angle related estimate obtaining element (908) is configured to, back project determined edge pixels onto a unit sphere, and determine the first estimate of the pitch and/or roll angle related information based on back projected edge pixels.

22. A system according to claim 21, wherein the first pitch and/or roll angle related estimate obtaining element (908) is configured to perform probabilistic voting for all edge pixels so as to determine the first estimate of the pitch and/or roll angle related information based on the back projected edge pixels.

23. A method according to claim 21, wherein the first pitch and/or roll angle related estimate obtaining element (908) further is configured to determine a first horizon estimate based on the back projected edge pixels.

24. A system according to claim 23, wherein:
the first pitch and/or roll angle related estimate obtaining element (908) further is configured to extract those edge pixel which are within a determined range from the first horizon estimate and to project the extracted edge pixels onto the unit sphere so as to provide an updated first horizon estimate; and
the improved estimate obtaining element (909) is configured to adjust the first estimate based on a relation between the updated first horizon estimate and a second horizon estimate obtained based on the digital elevation model so as to determine the improved estimate.

* * * * *